United States Patent [19]

McKinney

[11] 4,449,874

[45] May 22, 1984

[54] SELF-THREADING BOLT

[76] Inventor: Blake McKinney, P.O. Box 67, Marietta, Ohio 45750

[21] Appl. No.: 326,185

[22] Filed: Dec. 1, 1981

[51] Int. Cl.³ .......................................... F16B 25/00
[52] U.S. Cl. .................................... 411/418; 411/422
[58] Field of Search ............... 411/386, 387, 378, 418, 411/419, 422, 420, 421, 417; 10/1 B, 141 R; 408/207, 208, 222

[56] References Cited

U.S. PATENT DOCUMENTS

| 1,000,280 | 8/1911 | Messenger | 411/418 |
| 2,156,350 | 4/1937 | Olson | 411/420 |
| 2,387,720 | 6/1944 | Davis | 411/418 |
| 2,631,812 | 5/1948 | Mueller | 411/422 |
| 2,795,221 | 3/1953 | Braendel | 411/417 |
| 2,823,574 | 2/1958 | Rosan | 411/386 |
| 3,260,150 | 7/1966 | Colman | 408/207 |

FOREIGN PATENT DOCUMENTS 466039  5/1937  United Kingdom ............... 411/417

OTHER PUBLICATIONS

"Tap-Lok Self-Tapping Inserts", Groov-Pin Corp., Ridgefield, N.J., Pub. 10/6/59.

Primary Examiner—Thomas J. Holko
Assistant Examiner—Adrian Whitcomb
Attorney, Agent, or Firm—D. Paul Weaver

[57] ABSTRACT

A threaded fastener capable of recutting damaged screw threads during installation in a threaded opening has an axial opening in its leading end intersecting a transverse opening whose ends extend through the screw threads of the fastener. The fastener is provided in its periphery at least in one location thereon with a longtiudinal recess of greater depth than the screw threads which intersects the transverse opening at right angles thereto and extends longitudinally of the fastener away from one side of the transverse opening which is remote from the axial opening. A thread cutting surface is produced by the recess and thread cuttings pass therefrom into the transverse and axial openings during installation of the fastener.

1 Claim, 4 Drawing Figures

SELF-THREADING BOLT

BACKGROUND OF THE INVENTION

Thread recutting fasteners, such as bolts and screws, are known in the prior art and have been proposed in a number of specific forms. These devices have met with varying degrees of success in the marketplace. In some instances, the manufacturing cost of the fastener has proven too high to justify its use commercially. In other cases, where a lower cost self-threading fastener has been realized, its ability to recut threads has been less than desirable.

Accordingly, the simple objective of this invention is to provide a self-threading fastener of the mentioned type which is an improvement over the known prior art in terms of its operational efficiency and which is very simple in its construction and therefore economical to manufacture and practical.

The invention embodies a threaded fastener, such as a bolt or a screw, having a small axial opening in its leading end intersecting and communicating with a right angular transverse opening slightly inwardly of the leading end of the fastener. One end of the transverse opening is intersected by a groove or recess formed in the threads of the fastener and being somewhat deeper than the threads and extending along the shank of the fastener for a distance away from the inner side of the transverse opening. Thread cutting produced by insertion of the self-threading fastener into damaged threads pass from the groove into the transverse opening and then into the axial opening.

Other features and advantages of the invention will become apparent during the course of the following detailed description.

DETAILED DESCRIPTION

Figure 1:
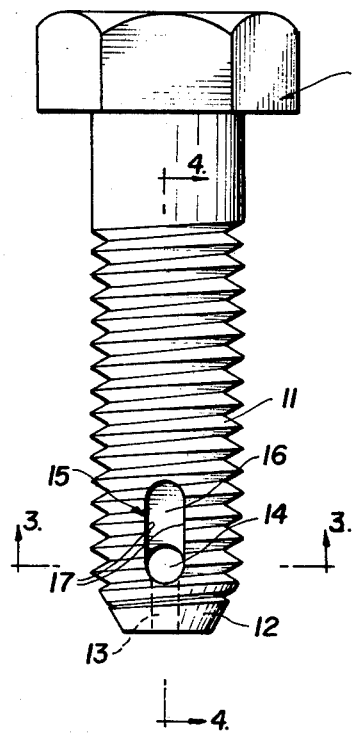
FIG. 1 is a side elevation of a self-threading fastener in accordance with the invention.
Figure 2:
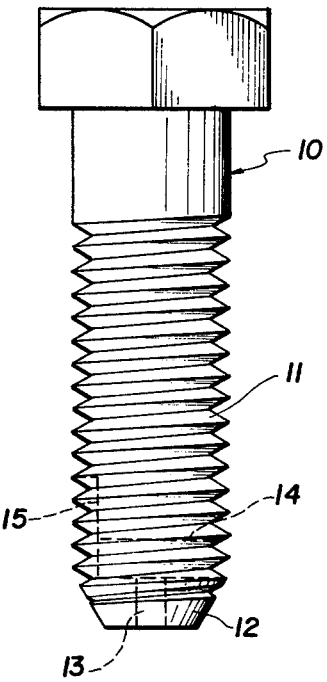
FIG. 2 is a side elevation of the fastener viewed at right angles to FIG. 1.
Figure 3:
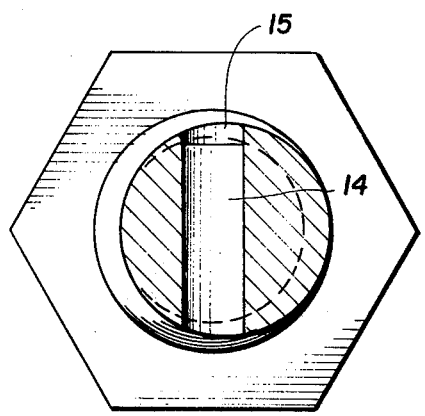
FIG. 3 is an enlarged transverse section taken on line 3—3 of FIG. 1.

Referring to the drawings in detail wherein like numerals designate like parts, the numeral 10 designates a bolt or screw whose threaded shank 11 is conically tapered at its leading end as shown at 12. A relatively small central axial opening 13 is formed in the leading end of the shank 11 and extends for a small distance inwardly where it intersects the center of a transverse opening 14 of like size or slightly larger size. The opening 14 extends at right angles to the opening 13 and opens through both sides of the threaded shank, being formed through the screw threads thereof.

An elongated longitudinal uniform depth groove or recess 15 is formed in the shank 11 at one entrance to the opening 14 and includes a flat surface 16 defining the depth of the groove which exceeds the depth of the screw threads. The surface or wall 16 is at right angles to the axis of the transverse opening 14.

The groove 15 which directly communicates with the opening 14 extends away from the interior side of such opening for a distance along the threaded shank, as shown. The groove 15 does not extend beyond the opposite or outer side of opening 14 toward the leading end of the fastener.

Figure 4:
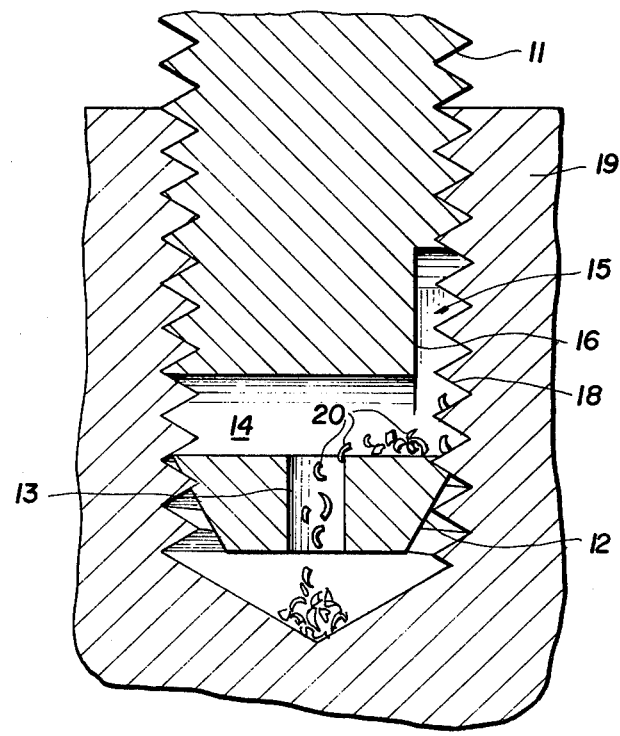
FIG. 4 is an enlarged fragmentary vertical section taken on line 4—4 of FIG. 1 showing the fastener inserted in a threaded opening having imperfect threads.

The side walls 17 of the groove 15 define cutting edges which recut damaged or imperfect screw threads 18 which may exist due to cross threading or the like in an object 19. In effect, the fastener 10 is self-threading in the sense that it can recut the damaged or imperfect screw threads 18 and clean such threads while being installed in a blind opening of the object as illustrated in FIG. 4.

In an important feature of the invention, metal cuttings 20 produced by the rethreading operation will be generated in the groove 15 and will pass through this groove into the transverse opening 14 which is intersecting one end of the groove. From the opening 14, the cuttings will enter the axial opening 13 and eventually will be collected in the blind opening of the object 19.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A threaded fastener adapted to recut damaged or imperfect metal screw-threads in a threaded opening into which the fastener is inserted, the fastener comprising a uniform diameter screw-threaded shank having standard metal threads, the shank being provided in its forward end with a central axial opening terminating somewhat rearwardly from said forward end, the shank also having a transverse through opening at right angles to the central axial opening and intersecting the central axial opening somewhat rearwardly of the forward end of the shank, the central axial opening and transverse through opening being in open communication and the transverse through opening forming the rear terminus of the central axial opening, and the shank further being provided in its threaded periphery with a longitudinal uniform depth substantially rectangular cross-section groove which is somewhat deeper than the radial depth of the screw-threads on the shank, said groove being of the same width as the transverse through opening and intersecting the latter at right angles and being in open communication with the transverse through opening, said groove starting from the forward side of the transverse through opening and extending longitudinally rearwardly on the shank to a point substantially rearwardly of said through opening, whereby metal particles produced during the installation of said fastener into a threaded opening may collect in said groove and pass from the forward end of the groove into the transverse through opening and from the latter into and through the central axial opening for collection in the bottom of the screw-threaded opening.

* * * * *